(12) United States Patent
Ludwig et al.

(10) Patent No.: US 9,596,864 B2
(45) Date of Patent: Mar. 21, 2017

(54) MASSAGING PRESS ROLLER

(71) Applicant: John Bean Technologies Corporation, Chicago, IL (US)

(72) Inventors: Ralf Ludwig, Accord, NY (US); Louis O. Timperio, New Windsor, NY (US)

(73) Assignee: JOHN BEAN TECHNOLOGIES CORPORATION, Chicago, IL (US)

( * ) Notice: Subject to any disclaimer, the term of this patent is extended or adjusted under 35 U.S.C. 154(b) by 0 days.

(21) Appl. No.: 14/827,171

(22) Filed: Aug. 14, 2015

(65) Prior Publication Data

US 2017/0042166 A1    Feb. 16, 2017

(51) Int. Cl.
*A22C 9/00* (2006.01)

(52) U.S. Cl.
CPC .................................. *A22C 9/004* (2013.01)

(58) Field of Classification Search
CPC ............ A22C 9/00; A22C 9/002; A22C 9/004
USPC .................................................. 452/141–145
See application file for complete search history.

(56) References Cited

U.S. PATENT DOCUMENTS

| | | |
|---|---|---|
| 1,958,936 A | 5/1934 | Bajette et al. |
| 3,892,988 A | 7/1975 | Gran |
| 4,133,075 A * | 1/1979 | Collins ................... A22C 9/004 452/142 |
| 4,343,067 A * | 8/1982 | Shelton ..................... A22C 9/00 452/142 |
| 4,360,952 A | 11/1982 | Sampson |
| 4,437,208 A | 3/1984 | Sampson |
| 5,785,589 A | 7/1998 | Lagares-Corominas |
| 6,036,591 A * | 3/2000 | Bonon ................... A22C 9/004 452/142 |
| 7,410,414 B2 | 8/2008 | Lagares Corominas |
| 8,764,524 B2 | 7/2014 | Lagares Corominas |
| 2005/0124276 A1* | 6/2005 | Gagliardi, Jr. ......... A22C 9/004 452/142 |
| 2006/0003681 A1* | 1/2006 | Kindermann .......... A22C 9/004 452/142 |

FOREIGN PATENT DOCUMENTS

NL    8800786 A    10/1989

OTHER PUBLICATIONS

Written Opinion and International Search Report mailed Sep. 22, 2016, issued in corresponding International Application No. PCT/US2016/046672, filed Aug. 12, 2016, 13 pages.

* cited by examiner

*Primary Examiner* — Richard Price, Jr.
(74) *Attorney, Agent, or Firm* — Christensen O'Connor Johnson Kindness PLLC (57) ABSTRACT

A massaging press roller for tenderizing a food product includes a shaft and at least one roller element disposed on the shaft. The at least one roller element is configured to impart a pulsating pounding action on a food product.

17 Claims, 7 Drawing Sheets

MASSAGING PRESS ROLLER

BACKGROUND

Food processing systems may employ various devices for preparing food products. For instance, injectors may be used for introducing solutions such as marinades, brines, and other additives into the food products, such as meat. A macerator may be used to tenderize the meat before or after the meat is injected with a solution.

A prior art food processing system having an injector and a macerator for processing meat or other food products is described and illustrated in U.S. Pat. No. 8,764,523, issued on Jul. 1, 2014, entitled "Macerator Having Automated Roller Spacing Control," the disclosure of which is hereby incorporated by reference in its entirety. U.S. Pat. No. 8,764,523 discloses a macerator 14 having a tenderizing mechanism 44 defined by first and second rollers 50 and 52, each having a plurality of knife blades 56 disposed around a shaft 54 for cutting into the food product (see FIG. 2). In an alternative configuration, the macerator includes at least one press roller 300 having an outer surface 302 with a plurality of ridges 304 that are adapted to compress and tenderize the food products (see FIG. 13).

Certain cuts of meat or other food products require a more aggressive tenderizing action for breaking down the collagen fibers in the product and for distributing the solution or other ingredients into the meat, rather than merely cutting into the meat or providing a constant force on the meat. Accordingly, there is a need for an improved mechanism for tenderizing food products.

SUMMARY

A massaging press roller for tenderizing a food product includes a shaft and at least one roller element disposed on the shaft. The at least one roller element is configured to impart a pulsating pounding action on a food product, and it may include a body having an outer surface extending axially along at least a portion of the shaft, wherein the outer surface defines at least one lobe and at least one groove.

A tenderizing mechanism includes a massaging press roller comprising at least one massaging press roller element disposed on a first shaft. The at least one massaging press roller element is configured to impart a pulsating pounding action on a food product. The tenderizing mechanism further includes an opposing roller positioned adjacent to the massaging press roller. The opposing roller includes at least one opposing roller element disposed on a second shaft.

A method of tenderizing a food product includes providing a massaging press roller having at least one massaging press roller element disposed on a first shaft. The method further includes imparting a pulsating pounding action on a food product by engaging the outer surface of the at least one roller element with the food product and rotating the massaging press roller about a longitudinal axis of the first shaft.

In one embodiment, the roller element is configured to impart a regular, rhythmic pulsating pounding action having a predefined frequency.

In another embodiment, the roller element is configured to impart a pulsating pounding action having a predefined frequency.

In yet another embodiment, the roller element is configured to impart an irregular, pulsating pounding action.

In yet another embodiment, the at least one massaging press roller element rotates at a rotational speed of 110-116 rotations per minute (rpm).

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

The detailed description set forth below in connection with the appended drawings is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known devices have not been described in detail in order not to unnecessarily obscure various aspects of the present disclosure. Further, it will be appreciated that embodiments of the present disclosure may employ any combination of features or steps described herein.

Embodiments of the present disclosure are directed to massaging press rollers for tenderizing food products. The massaging press rollers will be described herein for use in a macerator of a food processing system. It should be appreciated that the massaging press rollers may be used in a food processing system other than the one shown and described, or in any suitable device or system. Thus, the descriptions and illustrations provided herein should not be seen as limiting the scope of the present disclosure.

Figure 1:
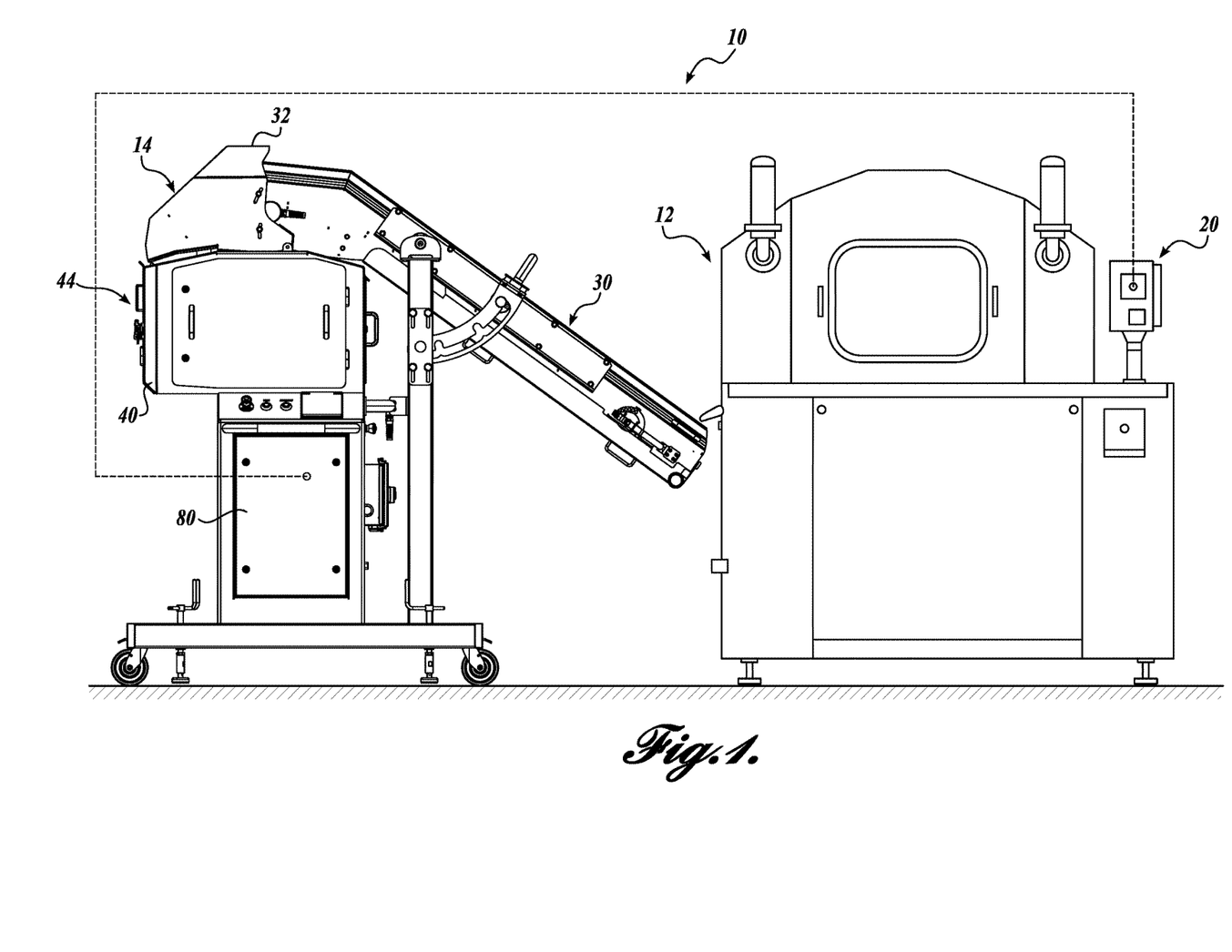
FIG. 1 is an environmental view of an exemplary food processing system having an injector and a macerator, with each of the injector and macerator connected to a control system.

Referring to FIG. 1, an exemplary food processing system 10 includes an injector 12 and a macerator 14. The injector 12 can be any suitable injector utilized for injecting or otherwise introducing a solution, such as a brine, marinade, or additive (hereinafter collectively referred to as a "solution"), into a food product (not shown) that has been introduced into the injector 12. One suitable type of injector 12 is the IMAX 620 manufactured by Schröder of Germany. The detailed components of the injector 12, such as the injection needles, inject solution valves, walking beam conveyor or belt-type conveyor, among others, are well-known in the art and are utilized to effectively inject the desired solution into the food product to achieve an optimal condition for the product prior to further processing, such as massaging, pack-off, and/or cooking. The solution supplied to the injector 12 can come from a number of different sources, such that different types of solutions can be supplied to the injector 12 for use with various types of food products.

To control the type and amount of the solutions supplied to the injector 12 during its operation, the injector 12 includes a control box 20 that is utilized to control both the operation of the injector 12 and the flow of the various solutions to the injector 12. The control box 20 includes various input devices (not shown) that enable an individual to select the operating parameters for the injector 12 to process a particular food product to be positioned within the injector 12. The control box 20 may also include a suitable electronic central processing unit (CPU) and electronic storage medium in which is stored a number of preset operating parameters for the injector 12 that correspond to the desired settings for the injector 12 for use in processing certain types of food products.

From the injector 12, the food product is transferred onto a conveyor 30, which advances the food product upwardly towards an inlet 32 for the macerator 14. The macerator 14 includes a housing 40 situated beneath the inlet 32 that encloses a tenderizing mechanism 44 for processing food products received in the macerator 14.

Figure 2:
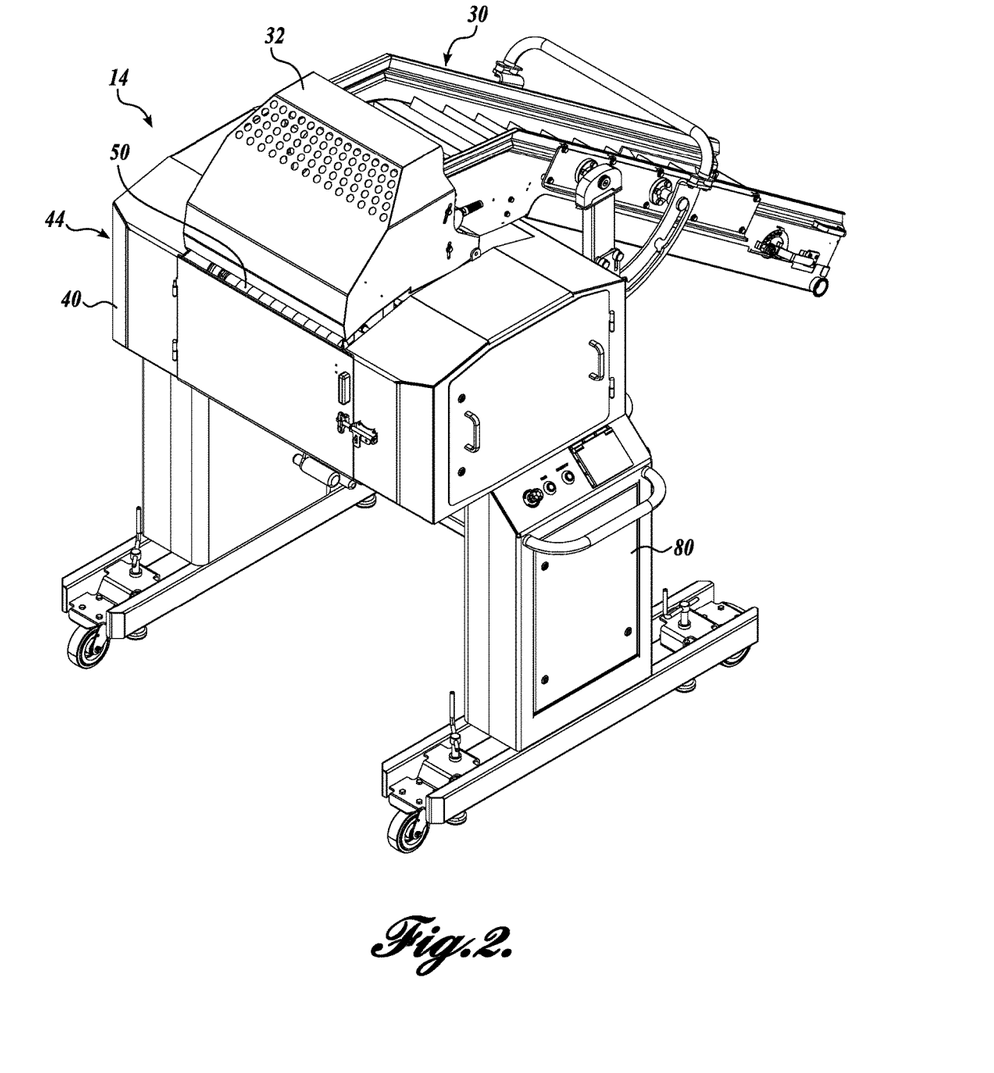
FIG. 2 is an isometric view of the macerator of the system of FIG. 1.
Figure 3:
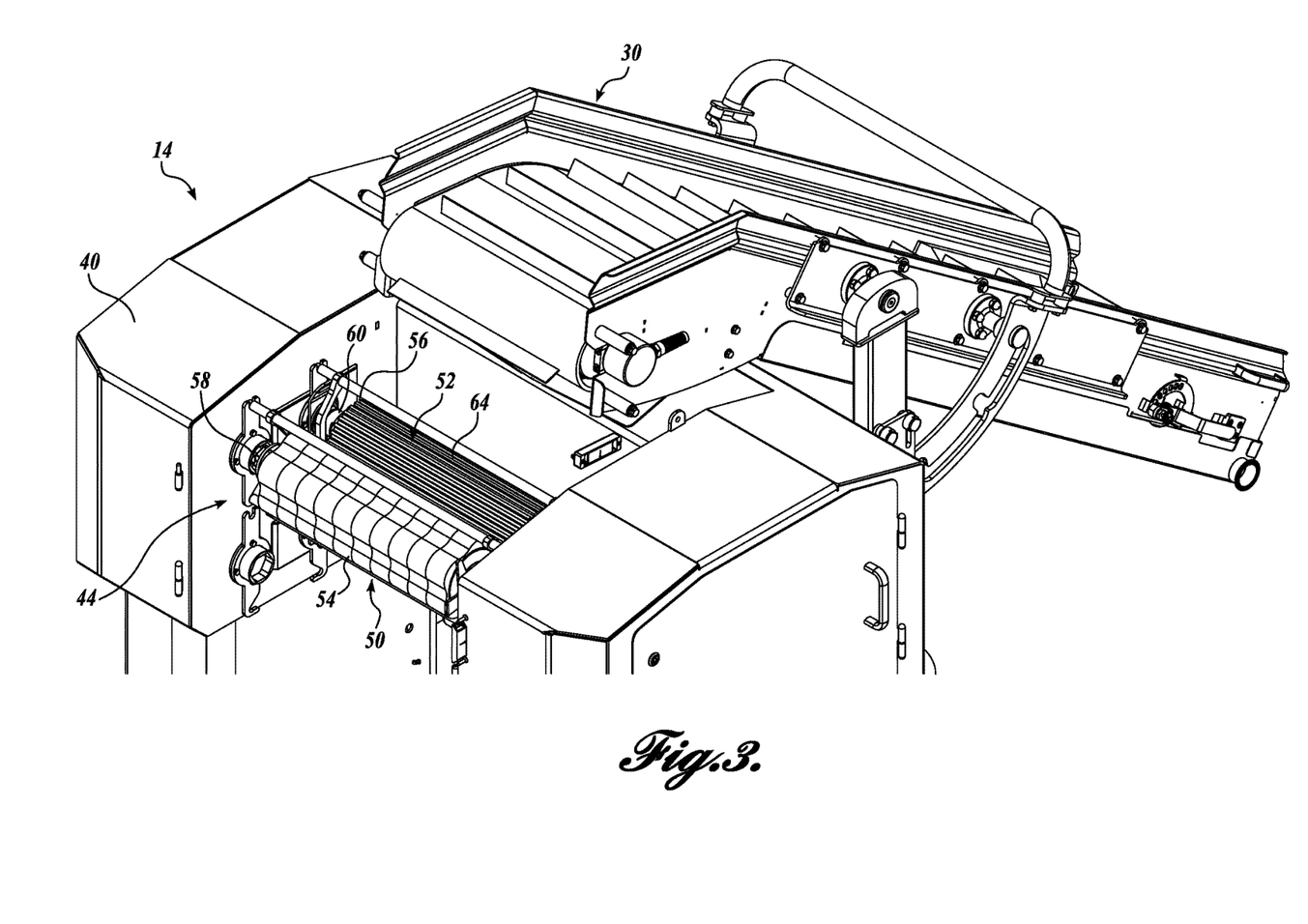
FIG. 3 is an isometric view of the internal components of the macerator of FIG. 2, wherein the internal components include a massaging press roller.

Referring to FIGS. 2 and 3, the tenderizing mechanism 44 comprises a massaging press roller 50 and an opposing roller 52 positioned adjacent thereto. The outer diameters of the massaging press roller 50 and the opposing roller 52 are spaced apart a predefined, adjustable distance for receiving and processing food products therebetween.

The massaging press roller 50 includes one or more roller elements 54 centrally disposed on a first shaft 58, which may be made from stainless steel or another suitable material. The roller elements 54 are shown extending axially along substantially the entire length of the first shaft 58, although it should be appreciated that they may instead extend along only a portion thereof Moreover, although the massaging press roller 50 is shown as having a plurality of roller elements 54, it should be appreciated that the massaging press roller 50 may instead be comprised of a single roller element extending partially or along substantially the entire length of the first shaft 58.

Figure 4:
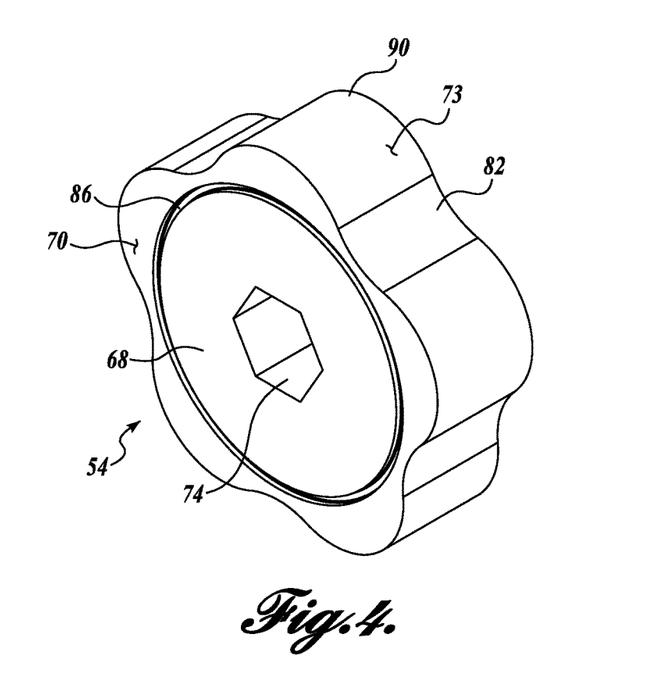
FIG. 4 is a front isometric view of a first exemplary embodiment of a roller element of the massaging press roller of FIG. 3.
Figure 5:
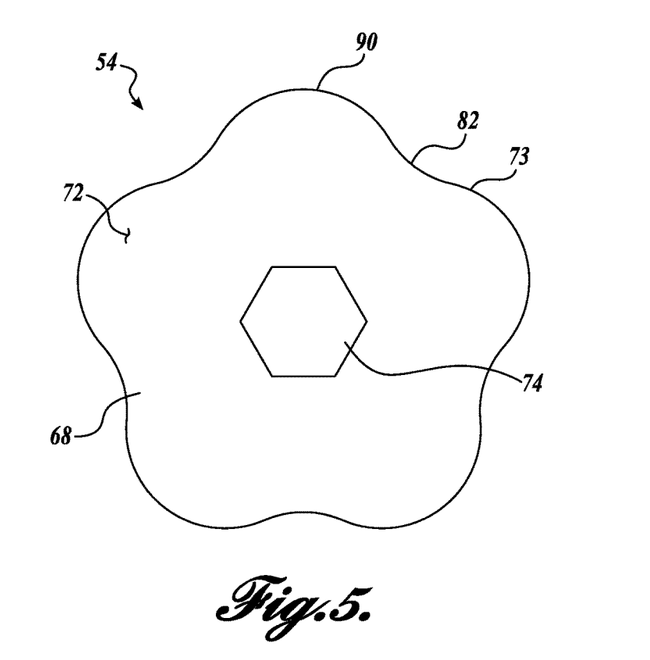
FIG. 5 is a rear view of the roller element of FIG. 4.

Referring additionally to FIGS. 4 and 5, each roller element 54, which may be made from plastic, metal, or another suitable material, is shaped and configured to massage food products passing over the massaging press roller 50 with a pulsating pounding action. In that regard, each roller element 54 is defined by a body 68 having a first end face 70 and a second end face 72 opposite the first end face 70, with the first and second end faces 70 and 72 disposed substantially transversely to the first shaft 58 when the roller element 54 is received thereon.

The roller element 54 may be removably or fixedly secured on the first shaft 58 in any suitable manner. In the depicted embodiment, a central opening 74 extends axially through substantially the center of the body 68 of the roller element 54 for receiving the first shaft 58. The central opening 74 substantially corresponds to the shape and cross-sectional shape and size of the first shaft 58, which is hexed shaped or another suitable non-circular shape. In this manner, the roller element 54 is rotatable with the first shaft 58 as the first shaft 58 rotates about its central longitudinal axis.

When received on the first shaft 58, the first end face 70 of a first roller element 54 abuts a second end face 72 of a second, adjacent roller element 54. A suitable interface may be defined between adjacent roller elements 54 to help secure the roller elements 54 together for defining the assembled massaging press roller 50.

The massaging press roller 50 may further include a suitable seal assembly for maintaining a sanitary interface between adjacent roller elements 54 and between the first shaft 58 and the roller elements 54. For example, an O-ring or other sealing element (not shown) may be disposed between adjacent roller elements 54. The O-ring may be receivable within a circular groove 86 defined on the first end face 70 of each roller element 54 that is substantially concentric with the central opening 74. When the massaging press roller 50 is assembled, the stacked roller elements compress the O-rings to create a seal between adjacent roller elements. Consequently, the seal assembly substantially prevents any unsanitary fluids or debris, from raw meat or other sources, from contacting or becoming lodged between the roller elements 54 and/or between the shaft 58 and the roller elements 54.

An outer surface 73 extends substantially transversely between the first and second end faces 70 and 72 across the thickness of the body 68. The outer surface 73 is contoured to give the roller element 54 an overall cross-sectional shape configured to deliver a pulsating pounding action to the food product when rotated by the first shaft 58. More specifically, the body 68 has a substantially circular overall cross-sectional shape (or a substantially circular outer diameter) with a plurality of grooves 82 extending axially along the outer surface 73 across the thickness of the body 68 and an axial lobe 90 defined between each of the adjacent grooves 82. The alternating groove/lobe pattern produces a pulsating pounding action against the food product when passing through the tenderizing mechanism 44.

In the embodiment depicted in FIGS. 2-5, the roller element 54 includes five alternating grooves 82 and lobes 90 spaced evenly around the outer diameter of the body 68 in a "five point lobed" pattern to create a regular, rhythmic pulsating pounding action having a predefined frequency. It should be appreciated that fewer or more than five grooves 82 and lobes 90 may be included to vary the frequency of the pulsating pounding action imparted on the food product. For instance, in the alternative embodiment depicted in FIGS. 6 and 7 (where like parts are identified with like reference numerals in the '100' series), the roller element 154 includes a body 168 having a first end face 170 and a second end face 172 opposite the first end face 170, and an outer surface 173 extending substantially transversely between the first and second end faces 170 and 172 across the thickness of the body 168. A central opening 174 extends axially through substantially the center of the body 168 for receiving a shaft (not shown), and a circular groove 186 defined on the first end face 170 that is substantially concentric with the central opening 174. The roller element 154 further includes ten alternating grooves 182 and lobes 190 spaced evenly around its outer diameter in a "ten point lobed" pattern, which would impart a higher frequency pulsating pounding action on the food product in comparison to the five point lobed pattern.

The pulsating pounding action rhythm and force may also be varied by the outer diameter pattern and contour of the body 68. For instance, the grooves and lobes need not be spaced evenly around the outer diameter of the body 68, and the lobes and grooves may be substantially the same size and shape (with the lobe 90 being substantially the same size and shape as the groove 82, inverted) or different in size and shape. Moreover, the size and shape of the lobes and grooves may vary. For instance, the size of the lobes and grooves may increase from a starting point on the outer diameter of the body 68, thereby increasing the force imparted on the food product as the roller element 54 rotates. Finally, it should be appreciated that a suitable contour, shape, geometry, etc., other than a lobe/groove pattern may instead be used to impart a regular or irregular pulsating pounding action on the food product. Thus, it should be appreciated that any suitable roller element design may be used to create a pulsating pounding action on the food products.

Referring back to FIGS. 2 and 3, the massaging press roller 50 is assembled with a plurality of roller elements 54 centrally disposed on the first shaft 58, with the first end face 70 abutting the second end face 72 of an adjacent roller element 54. When fully assembled, the massaging press roller 50 is configured to deliver a pulsating pounding action to food products fed through the tenderizing mechanism 44. A suitable structure may be positioned opposite the massaging press roller 50 to provide an opposing compressive force against which the food product may be tenderized. In the depicted embodiment, an opposing roller 52 is positioned opposite the massaging press roller 50 such that food product is compressed and tenderized between the massaging press roller 50 and the opposing roller 52 as it is fed through the tenderizing mechanism 44.

The opposing roller 52 may be any suitable roller, such as a second massaging press roller, a knife blade roller, or a press roller with axial ridges (such as the rollers shown and described in U.S. Pat. No. 8,764,523), etc. In the depicted embodiment, the opposing roller 52 is a gripping roller having a roller element 56 centrally disposed on a second shaft 60. The roller element 56 is shown as a single unit that extends substantially along the length of the second shaft 60, with axial ridges 64 extending axially along the length of the roller element 56. It should be appreciated that the roller element 56 may instead be comprised of two or more pieces, modular sections, etc. Moreover, although the axial ridges 64 are shown extending along substantially the entire length of the roller element 56, the ridges 64 may instead extend along only a portion thereof.

The rollers 50 and 52 are affixed to the housing 40 in a manner that enables the rollers 50 and 52 to rotate toward each other about the longitudinal axes of the first and second shafts 58 and 60, respectively, to draw the food products downwardly through the tenderizing mechanism 44. The first and second shafts 58 and 60 of each roller 50 and 52 are operably connected to first and second motors 96 and 98, respectively, that are operable to rotate the shafts 58 and 60, and consequently the roller elements 54 and 56 on each of the rollers 50 and 52. The motors 96 and 98 may rotate the rollers 50 and 52 at a suitable rotational speed, such as 110-116 rotations per minute (rpm).

The massaging press roller 50 includes a first air cylinder 92, and the opposing roller 52 includes a second air cylinder 94 that each act as an air cushion and are each operably connected to the motors 96 and 98, respectively, for backing out the rollers 50 and 52 to free any blockages that become engaged between the rollers 50 and 52. The pressure (psi) of the air cylinders 92 and 94 may also be varied to increase or decrease the force of the pulsating pounding action of the roller elements 54 and 56 on the food products.

The longitudinal center axes of the shafts 58 and 60 are positioned substantially parallel to one another in the tenderizing mechanism for receiving food products between the rollers 50 and 52. However, the position of the shafts 58 and 60, and therefore the gap defined between the outer diameter of the rollers 50 and 52, may be adjustable for receiving different types and thicknesses of food products. The gap may also be increased or decreased to decrease or increase, respectively, the force imparted onto the food product by the rollers 50 and 52. In that regard, the tenderizing mechanism 44 may include a suitable structure for automatically and/or manually adjusting the gap between the outer diameters of the rollers 50 and 52, the rotational speed of the rollers 50 and 52, the tension or force of the rollers 50 and 52, etc., such as the electromechanical structure shown and described in U.S. Pat. No. 8,764,523. The operator may select operating parameters of the macerator 14 through the macerator control box 80 or may instead manually adjust the rollers 50 and 52.

The macerator control box 80 may include various input devices (not shown) that enable an individual to select the operating parameters for the macerator 14 to process a particular food product to be positioned within the tenderizing mechanism 44. The macerator control box 80 may also include a suitable electronic central processing unit (CPU) and electronic storage medium in which is stored a number of preset operating parameters for the macerator 14 that correspond to the desired settings for the rollers 50 and 52 for use in processing certain types of food products. In the case of a double macerator that includes two sets of independently operated and controlled rollers, the parameters of the two sets of rollers can be controlled and adjusted together or separately according to the desired processing of the particular food product.

In that regard, a second set of rollers (not shown) may be positioned within the tenderizing mechanism 44 of the macerator 14 beneath or above the massaging press roller 50 and opposing roller 52. Any suitable second set of rollers may be included, such as massaging press rollers, knife blade rollers, gripping rollers, or press rollers, or any combination thereof.

A description of the pulsating pounding action of the massaging press roller 50 will now be provided with reference to the embodiment shown in FIGS. 1-5. After selecting an input on the injector control box 20 and/or the macerator control box 80 for a particular food product (such as beef, turkey, chicken, etc.), the food product is marinated or brined by the injector 12 (i.e., treated with a "solution") and transported to the macerator 14 by the conveyor 30. The food product is fed into the macerator inlet 32 and down into the tenderizing mechanism 44.

The food product passes between the massaging press roller 50 and the opposing roller 52, with a predetermined gap defined between the outer diameters of the rollers 50 and 52 (as optionally selected through the macerator controller 80). As the food product passes between the massaging press roller 50 and the opposing roller 52 (which in the depicted embodiment is a gripping roller), the massaging press roller 50 imposes a pulsating pounding action along the length of the food product. Each pulse of force is generated by a lobe 90 passing over and into the food product. The opposing gripping roller 52 helps secure the food product between the rollers 50 and 52 and moves the food product downwardly between the rollers 50 and 52 while providing a surface against which the pulsating force may be imparted. The distance between the outer diameters of the massaging press roller 50 and the opposing gripping roller 52 may be increased or decreased to decrease or increase, respectively, the pulsating force against the food product.

The pulsating pounding action helps tenderize the food product, making it thinner, more supple, and pliable, in comparison to, for example, a knife blade roller, which merely cuts into the food product. In the specific example of meat, the pulsating pounding action of the massaging press roller 50 weakens and breaks down the collagen fibers, especially in tougher cuts of meat such as beef.

Moreover, the pulsating pounding action of the massaging press roller 50 forcefully distributes any solution introduced into the food product upstream by the injector 20. Introducing a solution into a food product such as meat before or after processing helps improve taste, flavor, yield, and preservation. The results improve if the solution is distributed evenly throughout the food product. The pulsating pounding action of the massaging press roller 50 more quickly and evenly distributes the solution throughout the food product, creating an improved end product.

A number of tests and comparative tests were performed to investigate the benefits of a tenderizing machine having a lobed massaging press roller. The results are detailed in the EXPERIMENT below.

Experiment

Figure 6:
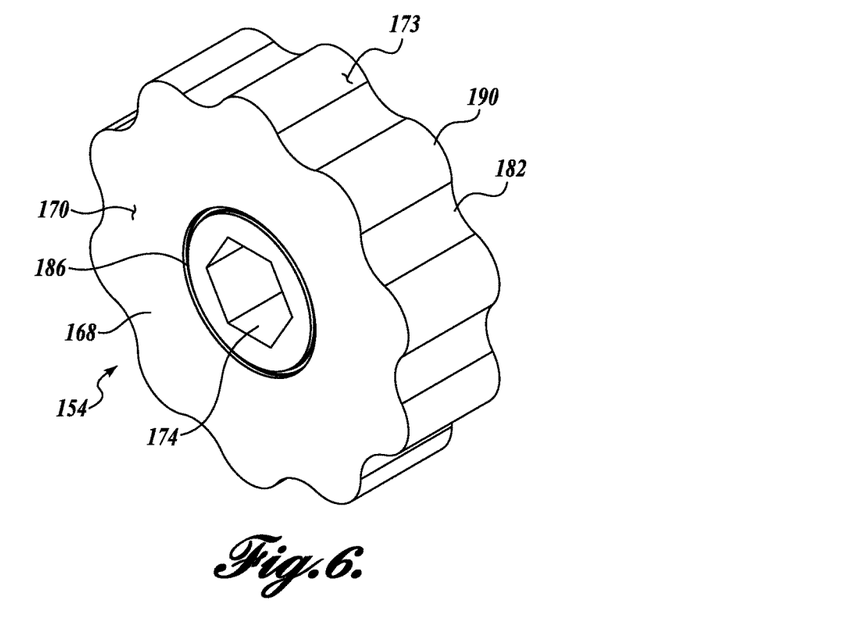
FIG. 6 is a front isometric view of a second exemplary embodiment of a roller element of a massaging press roller.
Figure 7:
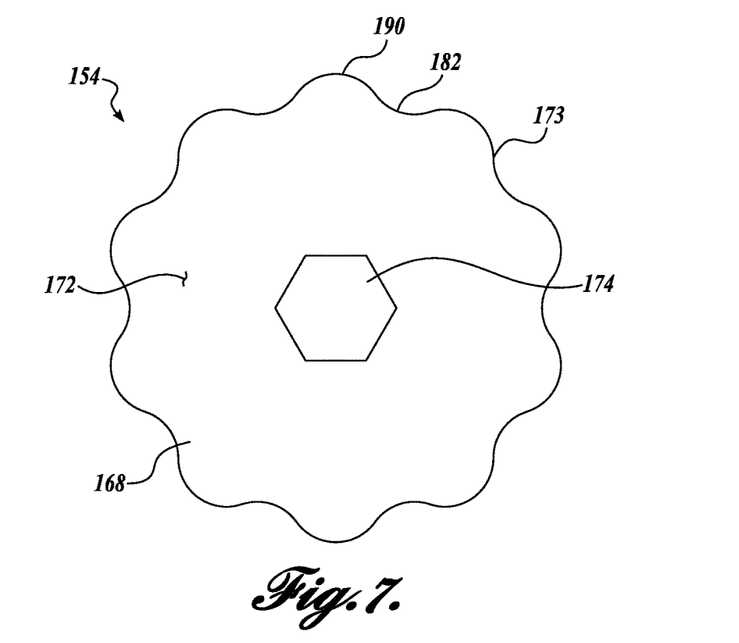
FIG. 7 is a rear view of the roller element of FIG. 6.
Figure 8:
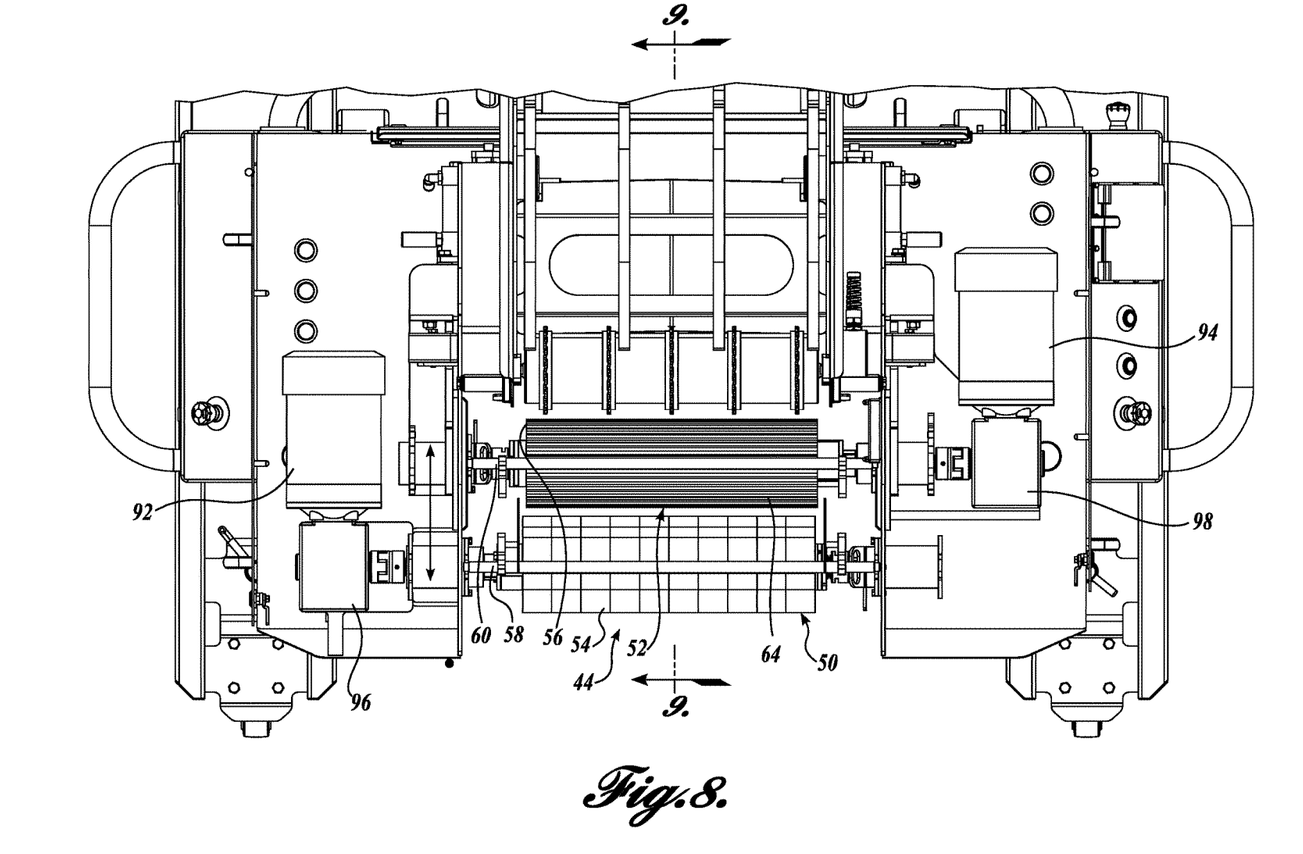
FIG. 8 is a top view of the internal components of the macerator of the system of FIG. 1.
Figure 9:
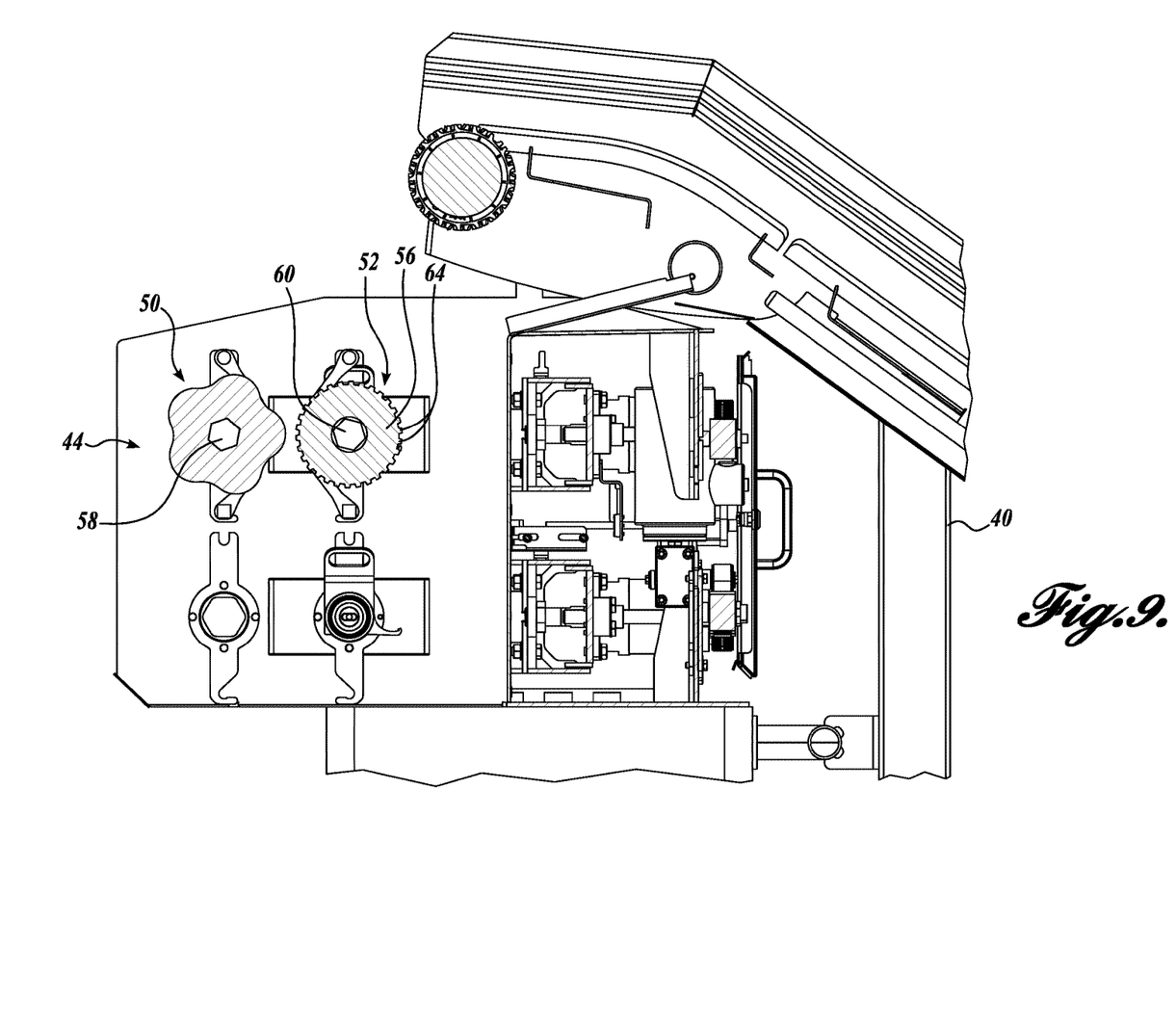
FIG. 9 is a partial cross-sectional side view of the internal components of the macerator of the system of FIG. 1.

The purpose of this experiment was to determine the tenderizing effect of a lobed massaging press roller used in a tenderizing mechanism of a macerator. The experiment was carried out with a FLEXCARVE® macerator, manufactured by JBT Wolf-tec of Kingston, N.Y. First and second press massaging press rollers were positioned adjacent to one another in the bottom of the tenderizing mechanism of the macerator. A first massaging press roller had ten grooves and lobes spaced evenly around the outer diameter of each roller element, as shown in FIGS. 6 and 7. The second press massaging press roller had five grooves and lobes spaced evenly around the outer diameter of each roller element, as shown in FIGS. 4 and 5. The roller elements of each massaging press roller were made of DELRIN® plastic and were disposed on a stainless steel shaft. The shafts rotated inwardly toward each other to pull the food product downwardly through the tenderizing mechanism 44 at a rotational speed of 110-116 rotations per minute (rpm).

The spacing between the outer diameters of the first and second massaging press rollers was adjustable from a beginning position (#0) of one-eighth inch (⅛") to a ninth position (#9) of two and five-eight inches (2⅝"). Positions #0 through #5 were tested. Single pieces of turkey and chicken were fed into the massaging press rollers.

The following observations were made by the inventors:
The action on the meat was pulsating in nature.
The pulsating pounding action on the meat caused the intermuscular fibers of the meat to become weakened, producing more supple and pliable meat product.
The meat was stretched and thinner in cross-section, thus increasing the surface area of the meat product. As a specific example, meat that was about three inches (3") thick was about one and one half inches (1½") thick after being fed through the massaging press rollers.
The muscle fibers were stretched and separated in an indiscriminate pattern.
When the gap between the massaging press rollers was decreased, the sections of meat became more stretched and thinner.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A tenderizing mechanism, comprising:
   (a) a massaging press roller comprising at least one massaging press roller element disposed on a first shaft, the at least one massaging press roller element having at least one lobe extending axially along an outer surface of the at least one massaging press roller element and at least one axial groove, wherein the at least one lobe is configured to impart a pulsating pounding action on a food product for massaging the food product as the massaging press roller is rotated about a first longitudinal axis of the first shaft; and
   (b) an opposing roller positioned adjacent to the massaging press roller, the opposing roller comprising at least one opposing roller element disposed on a second shaft that is substantially parallel to the first shaft, the at least one opposing roller element having an outer surface with a generally convex portion positioned opposite the at least one lobe against which the pulsating pounding action may be imparted on the food product.

2. The mechanism of claim 1, wherein the outer surface of the at least one massaging press roller element defines a plurality of lobes and a plurality of grooves in an alternating lobe and groove pattern.

3. The mechanism of claim 2, wherein the outer surface of the opposing roller element extends axially along at least a portion of the second shaft, wherein the outer surface of the opposing roller element defines a plurality of axial ridges having a cross-sectional width at least twice as small as a cross-sectional width of the lobe and having a cross-sectional height at least twice as small as a cross-sectional height of the lobe.

4. The mechanism of claim 1, wherein the first shaft is substantially parallel to the second shaft, and wherein a gap is defined between an outer diameter of the massaging press roller and an outer diameter of the opposing roller, and wherein the gap adjusts depending on the thickness of the food product to ensure a pulsating pounding action may be imparted onto the food product.

5. The mechanism of claim 4, further comprising a first air cylinder operably coupled to the massaging press roller and a second air cylinder operably coupled to the opposing roller, the first and second air cylinders configured to be varied in pressure to increase or decrease the force of the pulsating pounding action on the food product.

6. The mechanism of claim 1, wherein the at least one lobe has a convex curvature and the at least one groove has a concave curvature.

7. A method of tenderizing a food product, comprising:
   (a) passing a food product between a massaging press roller and an opposing roller, the massaging press roller comprising at least one massaging press roller element disposed on a first shaft, the at least one massaging press roller element having an outer surface with an alternating lobe and groove pattern defined by a plurality of grooves and a plurality of axial lobes defined between adjacent grooves, the opposing roller comprising at least one opposing roller element disposed on a second shaft that is substantially parallel to the first shaft, wherein the at least one opposing roller element includes an outer surface having a generally convex portion; and (b) rotating the massaging press roller about a first longitudinal axis of the first shaft and contra-rotating the opposing roller about a second longitudinal axis of the second shaft such that the plurality of axial lobes of the massaging press roller element impart a pulsating pounding action on the food product and the generally convex portion of the outer surface of the at least one opposing roller element is positioned opposite the plurality of axial lobes to provide a surface against which the pulsating pounding action may be imparted on the food product.

8. The method of claim 7, further comprising treating the food product with a solution before passing the food product between the massaging press roller and the at least one opposing roller such that the pulsating pounding action of the massaging press roller forcefully and substantially evenly distributes the solution throughout the food product.

9. The method of claim 7, further comprising adjusting a gap defined between an outer diameter of the massaging press roller and an outer diameter of the opposing roller and feeding the food product into the gap defined between the massaging press roller and the opposing roller.

10. The method of claim 9, further comprising automatically adjusting the gap to correspond to at least one of a specific food product and a thickness of a food product.

11. The method of claim 10, further comprising adjusting at least one of a first pressure of the massaging press roller and a second pressure of the opposing roller to impart a substantially constant force of the pulsating pounding action on the food product.

12. A method of tenderizing a food product, comprising:

(a) defining an initial gap between a first longitudinal axis of a massaging press roller and a second longitudinal axis of an opposing roller to correspond to a food product;

(b) passing the food product between the massaging press roller and the opposing roller while rotating the massaging press roller about the first longitudinal axis and contra-rotating the opposing roller about the second longitudinal axis such that at least one lobe of the massaging press roller imparts a pulsating pounding action on the first food product and a generally convex portion of an outer surface of the opposing roller positioned opposite the at least one lobe provides an opposing force against which the pulsating pounding action may be imparted on the first food product; and (c) adjusting at least one of the gap defined between the first longitudinal axis and the second longitudinal axis, a first pressure of the massaging press roller, and a second pressure of the opposing roller to impart a substantially constant force of the pulsating pounding action on the food product as it is passed between the massaging press roller and the opposing roller.

13. The method of claim 12, further comprising automatically increasing the gap between the massaging press roller and the opposing press roller to correspond to an increased thickness of the food product such that a substantially constant force of the pulsating pounding action is imparted on the food product as it is passed between the massaging press roller and the opposing roller.

14. The method of claim 12, further comprising automatically decreasing the gap between the massaging press roller and the opposing press roller to correspond to a decreased thickness of the food product such that a substantially constant force of the pulsating pounding action is imparted on the food product as it is passed between the massaging press roller and the opposing roller.

15. The method of claim 12, further comprising automatically increasing at least one of the first pressure of the massaging press roller and the second pressure of the opposing roller to increase the force of the pulsating pounding action on the food product when the thickness of the food product decreases.

16. The method of claim 12, further comprising automatically decreasing at least one of the first pressure of the massaging press roller and the second pressure of the opposing roller to decrease the force of the pulsating pounding action on the food product when the thickness of the food product increases.

17. The method of claim 12, further comprising treating the food product with a solution before passing the food product between the massaging press roller and the at least one opposing roller such that the pulsating pounding action of the massaging press roller forcefully and substantially evenly distributes the solution throughout the food product.

* * * * *